April 30, 1940.    E. J. BECK ET AL    2,199,064
ELECTRIC LIGHT FOR BICYCLES
Filed Oct. 17, 1938    2 Sheets-Sheet 1
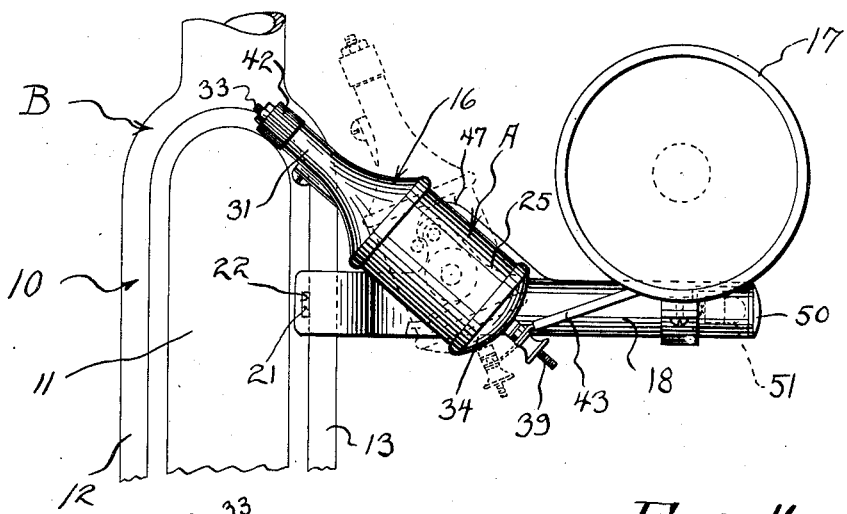
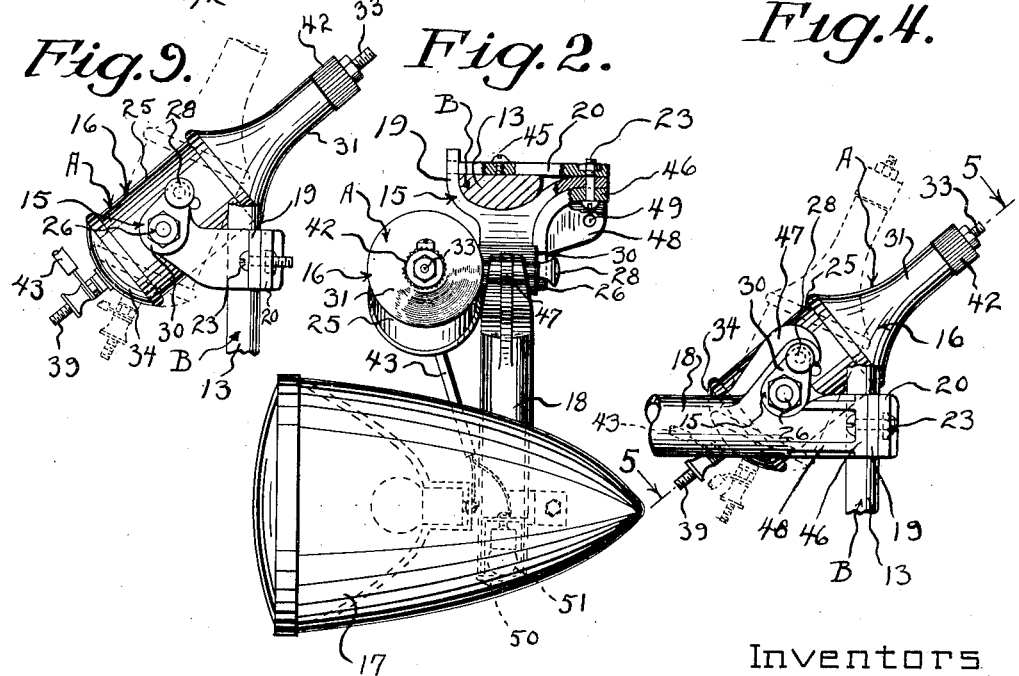
Inventors
G. G. Bluemink
E. J. Beck
By
Attorneys April 30, 1940.　　　E. J. BECK ET AL　　　2,199,064
ELECTRIC LIGHT FOR BICYCLES
Filed Oct. 17, 1938　　　2 Sheets-Sheet 2
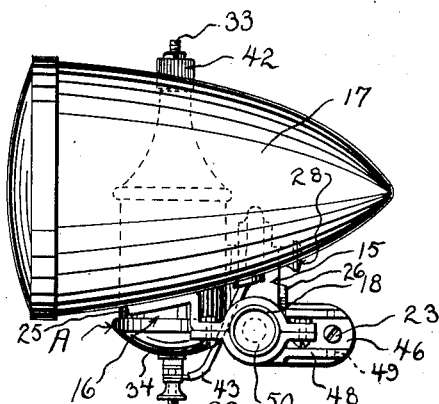
Fig. 3.
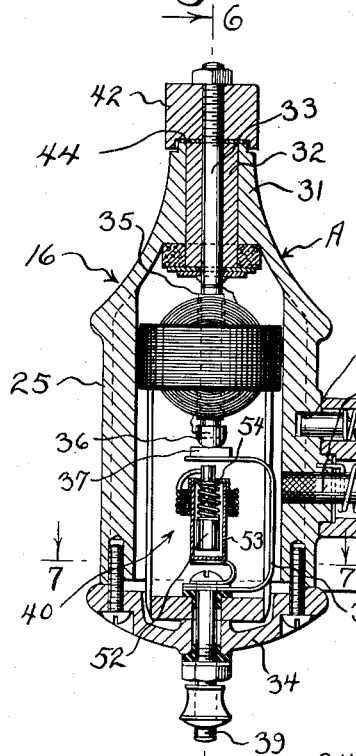
Fig. 5.
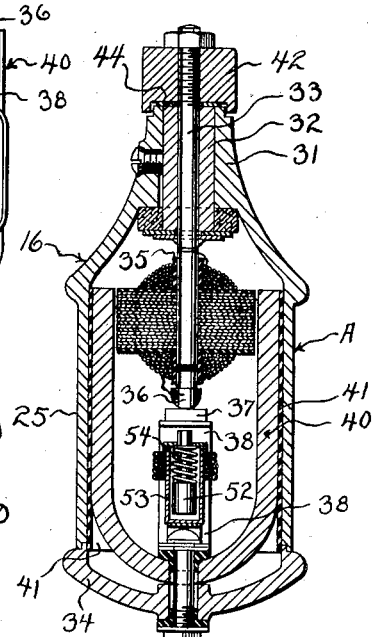
Fig. 6.
Fig. 8.
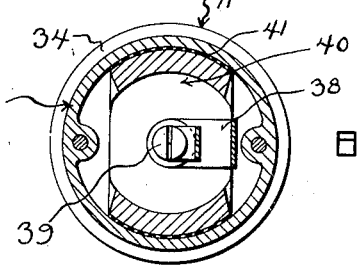
Fig. 7.
Inventors
G. G. Bluemink
and E. J. Beck
By
Attorneys Patented Apr. 30, 1940

2,199,064

UNITED STATES PATENT OFFICE 2,199,064

ELECTRIC LIGHT FOR BICYCLES

Einar J. Beck and Gary G. Bluemink, Racine, Wis., assignors of one-third to Hans Nelson, Racine, Wis.

Application October 17, 1938, Serial No. 235,363

2 Claims. (Cl. 240—7.6)

This invention appertains to illumination, and more particularly to electric lights for bicycles and similar vehicles.

One of the primary objects of our invention is to provide novel means for mounting a generator on the frame of a bicycle, whereby the generator can be conveniently moved and held either in an inoperative position, or in an operative driving engagement with a rotating part (wheel) of the bicycle.

Another salient object of our invention is to provide a novel bracket for clamping engagement with a part of a bicycle for supporting the generator and headlight for the bicycle.

A further object of our invention is the provision of novel means for pivotally mounting the generator on the supporting bracket, with spring means for urging the generator and its driving wheel into contact with the tire of the bicycle, the generator and bracket being provided with cooperative means for releasably holding the generator and driving wheel away from the bicycle tire against the tension of said spring means.

A further important object of our invention is the provision of means for detachably connecting an arm to the bracket for supporting the headlight when it is desired to connect the headlight adjacent the generator.

A still further object of our invention is to provide means for cutting a resistance coil into the circuit of the generator and headlight when the generator is driven too rapidly, whereby to prevent the burning out of the bulbs of the headlight.

A still further important object of our invention is to provide a headlight attachment for bicycles of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 1 is a front elevation of our improved electric light attachment for bicycles, showing the same attached to the frame of a bicycle, only a portion of the bicycle being illustrated.

Figure 2 is a top plan view of our bicycle light attachment, showing a part of the bicycle frame in section and a part of the attachment in section.

Figure 3 is a side elevational view of our novel headlight attachment for bicycles.

Figure 4 is a rear elevational view of our headlight attachment, showing the generator in its operative position in full lines, and in its inoperative position in dotted lines.

Figure 5 is a sectional view through the generator and associate parts, taken on the line 5—5 of Figure 4, looking in the direction of the arrows, the view being on an enlarged scale.

Figure 6 is a longitudinal sectional view through the generator, taken on the line 6—6 of Figure 5, looking in the direction of the arrows.

Figure 7 is a transverse sectional view through the generator, taken on the line 7—7 of Figure 5, looking in the direction of the arrows.

Figure 8 is a fragmentary sectional view of the generator, showing the generator without the resistance coil.

Figure 9 is a view similar to Figure 4, showing the arm for the headlight removed from the supporting jacket.

Referring to the drawings in detail, wherein similar reference characters designate corresponding parts throughout the several views, the letter A generally indicates my novel electric lighting attachment for a bicycle B. The bicycle B forms no part of the present invention, and can be of any preferred character, size, or make, and only a sufficient portion thereof has been illustrated to show the use of my attachment. The bicycle B includes the front fork 10 for a wheel 11. The front fork 10 includes the usual arms 12 and 13.

Our novel electric lighting attachment A comprises a supporting bracket 15, a generator 16, an electric headlight 17, and an arm 18 for supporting the headlight 17 from the bracket 15.

The bracket 15 includes a substantially U-shaped body portion 19 for straddling one arm 13 of the front fork 10. This body 19 forms one jaw of a clamp and detachably receives a clamping plate 20 for engaging the other side of the arm 13 from the U-shaped body 19. One end of the plate 20 is provided with a tongue 21 for insertion in an opening 22 in the body, and the other end of the plate 20 is detachably connected to the body 19 by means of a removable bolt 23. When the bolt is tightened, the bracket is firmly united with the bicycle fork. The bracket rotatably supports a stud 24, which is securely anchored to the casing 25 of the generator 16. The stud 24 extends through the bracket and is held against accidental displacement by means of a nut 26 threaded on the stud against the bracket. Thus, the generator is mounted for free swinging movement on the bracket.

A spiral spring 27 is coiled about the stud 24, and one end of the spring is anchored to the casing 25 of the generator, and the other end of the spring is anchored to the bracket. The spring functions to normally swing the generator toward the bicycle wheel 11, as will be more clearly set out. The bracket is preferably recessed to form a chamber for the spring 27.

The bracket also supports a sliding spring-pressed plunger or latch 28, and the casing 25 of the generator has formed therein a socket 29 into which is adapted to snap the inner end of the spring-pressed plunger 28, when the generator is in a raised inoperative position away from the bicycle wheel 11. By grasping the plunger or latch and pulling out on the same, the plunger can be removed from the socket 29, and the generator will then swing under impulse of its spring 27 toward the bicycle wheel. The bracket 15 is enlarged, as at 30, for receiving the pivot stud 24 and the spring-pressed latch 28.

Referring more particularly to the generator, the same includes the metallic casing 25 heretofore mentioned, and one end of the casing is reduced, as at 31, for receiving a bearing 32 for the armature shaft 33. The other end of the casing 25 is closed by a removable cap 34. The armature includes the usual coils mounted on insulated sleeves 35, and the coils can be connected to the opposite ends of the armature shaft, as shown. The inner end of the armature shaft has formed thereon a contact button 36, which is normally engaged by a spring-pressed contact point 37. This contact point 37 is supported by a U-shaped leaf spring 38, which is electrically connected with a centrally disposed binding post 39. The binding post 39 is insulated from the casing 25 by insulator washers. The casing receives the permanent field magnet 40, and the sides of the magnet can be spaced from the casing by fibre insulator sheets 41. The outer end of the armature shaft 33 protrudes beyond the casing 25, and has securely fastened thereto a drive pulley wheel 42 of the desired character.

The bracket 15 is so placed on the bicycle fork 10 that when the plunger 28 is moved outwardly and the generator swings toward the bicycle wheel 11, the friction wheel 42 will engage the tread or side of the tire of the bicycle wheel 11. Thus, when the wheel 11 rotates, the armature of the generator will be driven at a high rate of speed. One electric take-off wire 43 is electrically connected to the binding post 39 of the generator, and the casing is grounded to the bracket and thence to the bicycle frame. A screw 45 is utilized to insure a good ground between the bracket and the bicycle frame. A split spring washer 44 is placed between the pulley wheel 42 and the casing 25, which insures a good contact between the pulley and the generator casing.

The headlight 17 can be mounted on the bicycle at any preferred point, as the wire 43 can be made as long as desired. Thus, the headlight can be clamped on the handle bars, top frame bar, or the like.

It is preferred, however, to provide the supporting arm 18 for carrying the headlight, and this supporting arm 18 can be detachably connected to the bracket 15. The arm 18 is preferably of a hollow construction, and the inner end thereof has formed thereon a foot 46 for engaging the inner face of the bracket body 19 at one side, as is clearly shown in Figure 2. A hook 47 is formed on the arm 18 adjacent the foot 46, and engages over the enlarged portion 30 of the bracket. The bolt 23 employed for connecting the clamping plate 20 with the bracket, can pass through the foot 46 for securely holding the arm in position.

If desired, outwardly extending lugs or flanges 48 can be formed on the foot and arm on opposite sides of the screw 23, and these flanges or lugs are apertured, as at 49, for the reception of a padlock, so that the head of the screw 23 cannot be reached by unauthorized persons who might endeavor to remove the generator and headlight from the bicycle.

The headlight 17 can be of any desired character, and the incandenscent bulb thereof has one terminal connected to the wire 43, and its other terminal is grounded to the lamp casing and thence to the bracket or bicycle frame, as is readily apparent to those skilled in the art. While we have not shown a tail-light, it is to be understood that a wire 43 can be led to a tail-light on the bicycle. If desired, the outer end of the hollow arm 18 can be closed by a translucent or transparent glass 50, and an incandenscent bulb 51 can be placed in the arm 18 in rear of the glass. The terminals of the bulb can also be electrically connected to the wire 43 and to the ground.

Where the bicycle is driven at a high rate of speed, there is danger that an excess of current will be generated, which would burn out the incandescent bulbs. Consequently, we can provide means for cutting a resistance coil in the circuit when too much current is generated.

In Figures 5 and 6, we have shown one means for cutting in a resistance coil. This means may include a solenoid plunger 52 slidably mounted in a sleeve 53. The sleeve 53 is electrically connected to the binding post 39, as shown, and primary and secondary coils are wound upon the sleeve. The outer coil is electrically connected to the plunger 52. An expansion spring 54 is housed within the sleeve 53, and normally urges the plunger 52 away from the contact point 37 of the generator. Under normal conditions, the plunger 52 is held away from the contact point 36. However, if the armature rotates beyond a predetermined speed, the coils become energized, and the plunger 52 moves inwardly against the tension of its spring 54 into contact with the point 37, and, consequently, the coils are placed in circuit with the point 37 and the binding post 39, and a portion of the current will flow through the resistance coil and, thus, prevent the burning out of the lamp.

Changes in details may be made without departing from the spirit or the scope of our invention, but what we claim as new is:

1. An electric lighting attachment for bicycles and like vehicles comprising, a bracket, means clamping the bracket to a desired part of the frame of the bicycle, a generator including a casing and an armature shaft, a friction wheel secured to the armature shaft for engagement with a rotating part of the bicycle, an enlargement on the bracket, a stud bolt secured to the casing rockably mounted in said enlargement, a spring-pressed plunger carried by said enlargement for engaging the casing of the generator when the casing is in one of its positions, a supporting arm having a foot and a hook for engaging over the enlargement, a headlight electrically connected with the generator mounted upon said arm, said clamping means including a bolt passing through the foot, whereby to detachably hold the arm on the bracket.

2. An electric lighting attachment for bicycles and like vehicles comprising, a bracket, means clamping the bracket to a desired part of the frame of the bicycle, a generator including a casing and an armature shaft, a friction wheel secured to the armature shaft for engagement with a rotating part of the bicycle, an enlargement on the bracket, a stud bolt secured to the casing rockably mounted in said enlargement, a spring-pressed plunger carried by said enlargement for engaging the casing of the generator when the casing is in one of its positions, a supporting arm having a foot and a hook for engaging over the enlargement, a headlight electrically connected with the generator mounted upon said arm, said clamping means including a bolt passing through the foot, whereby to detachably hold the arm on the bracket, parallel spaced lugs formed on the foot disposed on opposite sides of the bolt and having openings therein for the reception of the hasp of a padlock, so that access to the bolt by unauthorized persons will be prevented

EINAR J. BECK.
GARY G. BLUEMINK.